United States Patent [19]

Satzler

[11] 4,360,313

[45] Nov. 23, 1982

[54] LIFT FIXTURE

[75] Inventor: Ronald L. Satzler, Princeville, Ill.

[73] Assignee: Caterpillar Tractor Co., Peoria, Ill.

[21] Appl. No.: 211,533

[22] PCT Filed: Mar. 24, 1980

[86] PCT No.: PCT/US80/00320

§ 371 Date: Mar. 24, 1980

§ 102(e) Date: Mar. 24, 1980

[87] PCT Pub. No.: WO81/02722

PCT Pub. Date: Oct. 1, 1981

[51] Int. Cl.³ .............................................. B65G 7/00

[52] U.S. Cl. .................................. 414/781; 414/783; 414/766

[58] Field of Search ....................... 269/258, 287, 164; 279/1 L; 294/88, 103 R, 113, DIG. 2; 414/621, 741, 754, 757, 764, 766, 781, 783, 787, 911

[56] References Cited

U.S. PATENT DOCUMENTS 1,672,808 6/1928 Hansel ................................ 269/160

1,918,439 7/1933 Warman ............................. 269/258

2,889,912 6/1959 Franklin et al. .................... 414/783

3,915,311 10/1975 Ball et al. ............................ 414/766

*Primary Examiner*—Trygve M. Blix

*Assistant Examiner*—Harry A. Smith

*Attorney, Agent, or Firm*—Wegner, Stellman, McCord, Wood & Dalton

[57] ABSTRACT

A lift fixture (10) for holding and centering a workpiece (93) includes a handling ring (16) defined by a yoke (17) and a clamp slide (20) mounted on the yoke, means (48) for closing the clamp slide (20), a support apparatus (12) for positioning the handling ring (16), and a plurality of angularly spaced holding mechanisms (33,34,40,41) for gripping the workpiece (93). The holding mechanisms (33,34,40,41) are movably mounted to the handling ring (16) so as to move relative to the ring along a line generally tangent to the workpiece (93). The holding mechanisms (33,34,40,41) are biased to a centered position, as by springs (87,88), so that when the workpiece (93) is lifted, it is urged to a centered position within the ring (16).

9 Claims, 8 Drawing Figures

FIG. 1
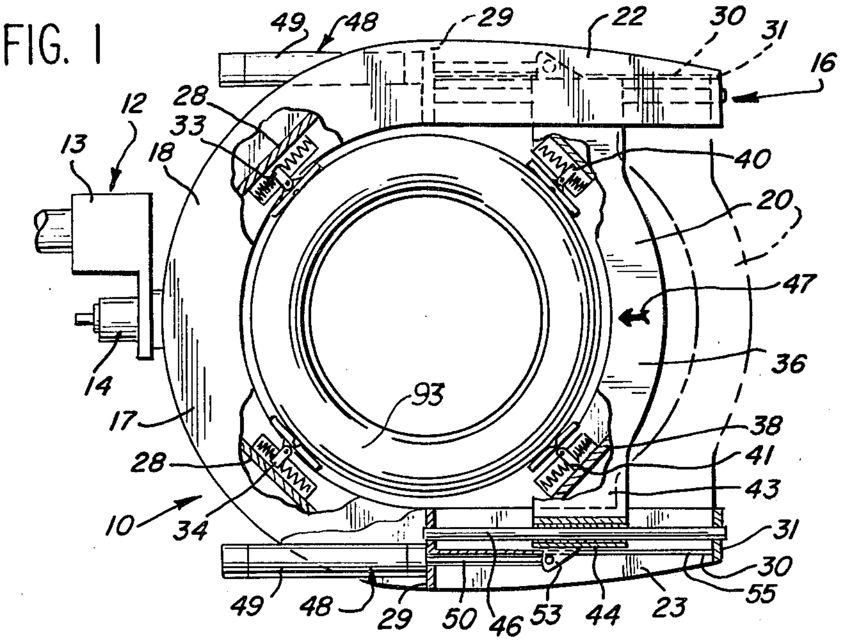
FIG. 2
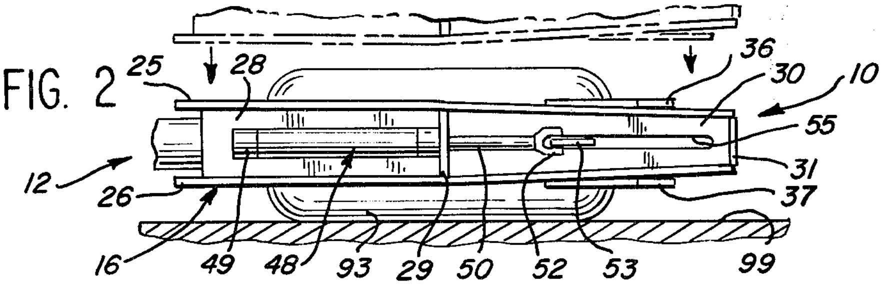
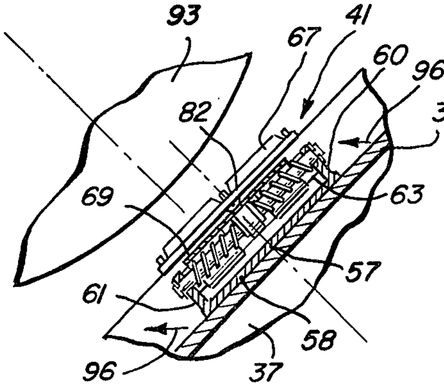
FIG. 3
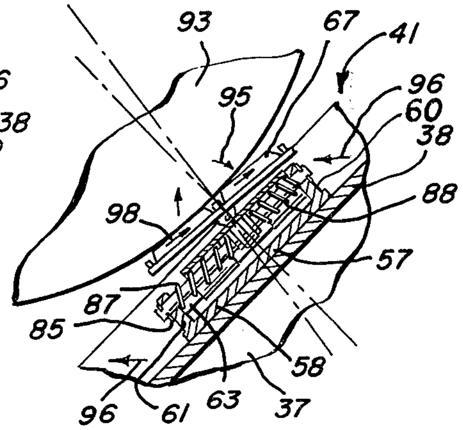
FIG. 4

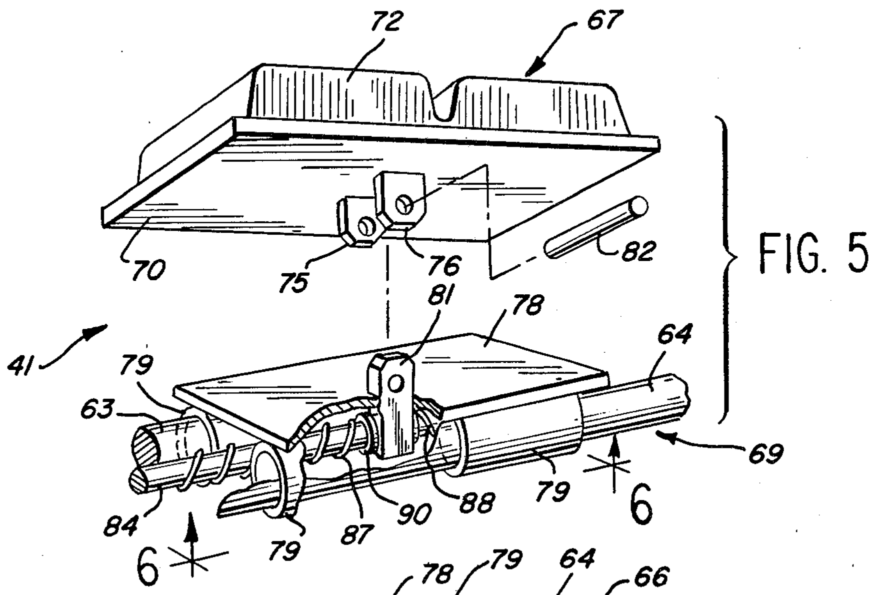
FIG. 5
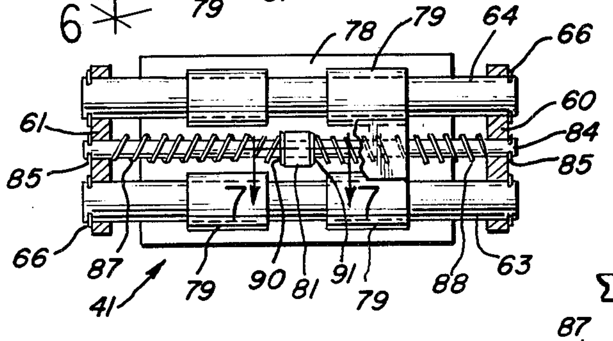
FIG. 6
FIG. 7
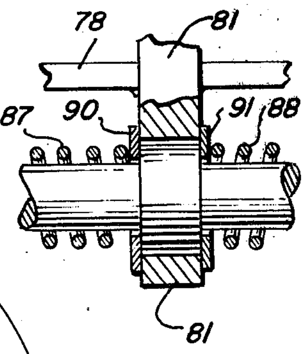
FIG. 8
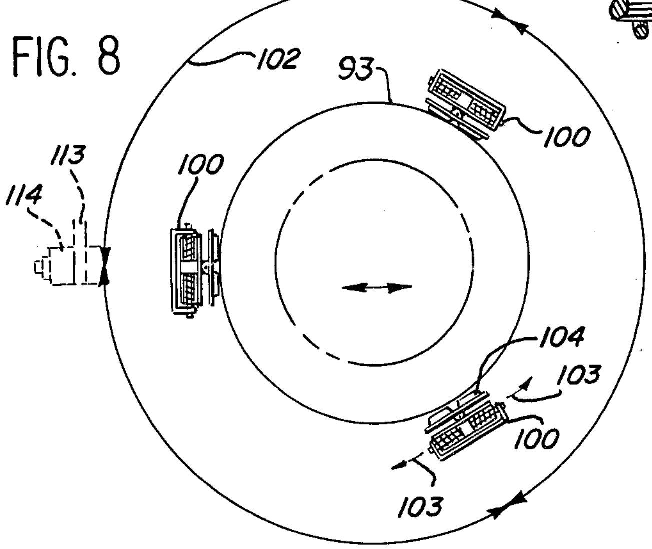

LIFT FIXTURE

DESCRIPTION

1. Technical Field

This invention relates generally to a material handling device for lifting and locating a workpiece and, more particularly, to such a device which grips and centers the workpiece without scuffing.

2. Background Art

Grawey U.S. Pat. No. 4,053,272, entitled "Apparatus and Method for Forming a Tube Article on a Core," issued Oct. 11, 1977 and assigned to the assignee of the present invention, discloses an exemplary apparatus for forming on a disintegrable sand core a tube article made from uncured elastomeric material, such as rubber. This sand core, during the manufacturing operation, must be lifted from a transporting pallet or conveyor, moved to and from the apparatus and turned so that layers of rubber material may be applied to both sides of the core.

Of particular importance in the manufacture of such tubes or tires is the proper formation of the oval, toroidal sand core in preparation for the wrapping of material thereabout. Obviously, handling and wrapping of the core at all stages of manufacture must be done with great care and accuracy to ensure that an unwrapped or partially wrapped core will have a properly prepared surface for further wrapping so that the final manufactured tire will be free from blemishes and perfectly balanced.

Thus, any material handling mechanism used to move or turn the core cannot damage or scuff the core. Otherwise, the finished tube or tire will be out of round or defective. Yet, sufficient force must be applied by the handling mechanism to lift and locate the core. Heretofore, material handling mechanisms employed for this purpose have not been entirely satisfactory in the automated production of these tubes. No mechanism has been found which is capable of use with cores of various size, which does not scuff the core, and which allows exact positioning of the core at a work station.

The present invention is directed to overcoming one or more of the problems as set forth above.

DISCLOSURE OF INVENTION

To overcome the problems associated with prior art constructions, a lift fixture is provided with self-centering holding mechanisms including pads which are movable relative to the lift fixture tangentially with respect to the surface of a workpiece that may be of varying size. When the workpiece is lifted, the action of the centering means automatically shifts the workpiece to the center of the lift fixture without undesirable scuffing of the surface in contact with the holding pads.

In accordance with the invention, the lift fixture includes a yoke and a movably mounted clamp slide which extends between the yoke arms so as to define a handling ring, the clamp slide being driven to a closed position by a fluid motor. The lift fixture has three or more angularly spaced pads, a portion of which are movably mounted on the yoke and a portion of which are mounted on the clamp slide.

In an exemplary embodiment of the invention, the holding devices have resilient pads which are carried on carriages which, in turn, are mounted for linear movement on the yoke and clamp slide. The resilient pads make intimate contact with and minimize scuffing of the core as the holding mechanisms are moved against the core.

In one aspect of the invention, the carriages engage and move along a linear slide rod and the resilient pads are pivotally mounted to the carriage. Preloaded springs acting on opposite sides of the carriage maintain the carriage in a centered position on the rod and bias the holding device toward a workpiece centering position when the workpiece floats between the self-centering pads.

In another aspect of the invention, the lift fixture is mounted on a support apparatus having horizontal, vertical, swinging, and rotational movement such that the lift fixture can be moved to any desired position. As a result, the lift fixture can transport the workpiece to any desired location or turn the workpiece over.

BRIEF DESCRIPTION OF DRAWINGS

FIG. 1 is a top view partially in section of an exemplary lift fixture constructed in accordance with the present invention;

FIG. 2 is an elevational view of the lift fixture of FIG. 1;

FIG. 3 is an enlarged, fragmentary elevational view of a holding mechanism shown spaced from the workpiece;

FIG. 4 is an enlarged, fragmentary elevational view similar to FIG. 3, but showing the holding mechanism in contact with the workpiece;

FIG. 5 is an exploded, perspective view partially in section of one of the holding mechanisms;

FIG. 6 is a bottom view of the holding mechanism taken along line 6—6 of FIG. 5;

FIG. 7 is an enlarged cross-sectional view taken along the lines 7—7 of FIG. 6; and FIG. 8 is a schematic view of an alternative embodiment of the lift fixture utilizing three holding mechanisms.

BEST MODE FOR CARRYING OUT THE INVENTION

In the exemplary embodiment of the invention shown in FIGS. 1 through 7, a lift fixture, generally designated 10, is carried by a support apparatus, broadly designated 12. The support apparatus 12 is adapted to position the lift fixture 10 in desired location and orientation. The support apparatus 12 includes a robot, a part of which is shown and designated 13, capable of horizontal, vertical, and swinging motion, and a rotary actuator 14 for rotating the lift fixture 10 one-hundred-eighty degrees.

The lift fixture 10 is seen to include a handling ring 16 comprising a horseshoe-shaped yoke 17 having a base portion 18 fixed to the support apparatus 12 and a clamp slide 20 mounted to the yoke 17 and extending between the arm portions 22 and 23 of the yoke 17. The arm portions 22 and 23 are spaced on either side on the central longitudinal axis of the yoke 17.

The yoke 17 (as shown in FIG. 2) comprises an upper plate 25, a lower plate 26, and various crosspieces 28,29,30 and 31 (as shown in FIG. 1), which are secured between the upper and lower plates 25 and 26 and which maintain the plates in spaced relation and provide structural rigidity. Mounted to the yoke 17 at an angle of ninety degrees relative to each other and at an angle of forty-five degrees relative to the yoke longitudinal axis are a pair of holding mechanisms 33 and 34.

The clamp slide 20 comprises an upper plate 36, a lower plate 37, and a crosspiece 38. Mounted to the clamp slide 20 at ninety degrees relative to each other and at an angle of forty-five degrees relative to the yoke longitudinal axis are a pair of holding mechanisms 40 and 41. Each end 43 of the clamp slide 20 is mounted for linear movement via bushings 44 to a clamp slide shaft 46 carried in each of the yoke arm portions 22 and 23. Movement of the clamp slide 20 along the yoke longitudinal axis, as indicated by arrow 47, is effected by a fluid clamping motor, or jack 48, located in each of the yoke arm portions 22 and 23. Each of the jacks 48 has an air cylinder 49 secured to the yoke crosspiece 29 and a rod 50 having a bifurcated end 52 pivotally connected to a clamp slide bracket 53, the bracket 53 extending through a slot 55 defined in the yoke crosspiece 30.

Each of the holding mechanisms 33,34,40 and 41 is movably mounted to its respective yoke 17 or clamp slide 20 by way of a mounting assembly 57. As shown herein, the holding mechanisms 33,34,40 and 41 are mounted on a common plane on the inside of the handling ring 16. Each mounting assembly 57 includes a base plate 58 fixed, as by bolts (not shown), to the yoke crosspiece 28 (FIG. 1) or to the clamp crosspiece 38 (FIGS. 3 and 4), a pair of spaced apart, upright end plates 60 and 61, and a pair of spaced, parallel guide shafts 63 and 64 (FIGS. 5 and 6) extending between the end plates 60 and 61 and held in place by retaining rings 66. The guide shafts 63 and 64 of each of the holding mechanisms is oriented at an angle of forty-five degrees relative to the yoke longitudinal axis.

Each of the holding devices 33,34,40 and 41 comprises a pad subassembly 67 and a carriage subassembly 69. The pad subassembly 67 includes a flat plate 70 (FIG. 5), a deformable soft rubber pad 72 on the topside of the plate 70 enclosed by a suitable cover bonded to the plate 70, and a pair of pin brackets 75 and 76 depending from the underside of the plate 70.

The carriage subassembly 69 includes a flat plate 78, four sleeves, each designated 79, fixed to the bottom of the plate 78, and a centrally located pivot block 81 extending above and below the plate 78. The sleeves 79 are arranged in co-linear pairs and slide linearly along the guide shafts 63 and 64 carried by the end plates 60,61 to mount the carriage subassembly 69 on the mounting assembly 57. Linear ball bearings (not shown) in the sleeves 79, with suitable retainers and seals, reduce friction between the shafts 63,64 and the sleeves 79. The upper end of the pivot block 81 is connected between the pin brackets 75 and 76 by a pivot pin 82 so as to mount the pad subassembly 67 to the carriage subassembly 69 and mounting assembly 57. A rod 84, which is also a part of the mounting assembly, extends through the pivot block 81 and is centrally fixed by retaining rings 85 between the end plates 60 and 61 of the mounting assembly 57 parallel to the guide shafts 63 and 64. The axis of the rod 84 is transverse to the axis of the pin 82. Preloaded springs 87 and 88 coiled about the rod 84, one on opposite sides of the pivot block 81, provide a spring force acting between the end plates 60 and 61 and the washers 90 and 91 located on either side of the pivot block 81. The springs 87 and 88 bias each of the pad subassemblies 67 and carriage subassemblies 69 of the holding mechanisms 33,34,40 and 41 to a longitudinally centered position relative to its respective mounting assembly 57.

In operation, the lift fixture 10 is positioned over the workpiece 93, as seen in FIGS. 2 and 3, and is lowered onto the workpiece 93 with the clamp slide 20 in open position as seen in phantom in FIG. 1. At this point, the lift fixture 10 is not in contact with the workpiece 93. The robot 13 then maneuvers the lift fixture 10 to center the workpiece 93 as close as possible between the yoke arms 22 and 23. The robot 13 then slowly drives the yoke 17 toward the workpiece 93 along the mid-circumferential plane of the workpiece until the so-called stationary holding mechanisms 33 and 34 contact the circumferential surface of the workpiece 93 with a measurable predetermined force. The holding mechanisms 33 and 34 operate in a manner similar to that described below with respect to the holding device 41.

Thereafter, the clamp slide 20 is moved by the jack 48 from its open position along the yoke longitudinal axis to a closed position until the so-called moving holding mechanisms 40 and 41 make contact with the workpiece 93. When the clamp slide holding mechanisms 40 and 41 contact the workpiece 93, the pad subassemblies 67 will not move along the circumferential surface of the workpiece 93. However, as shown in FIG. 4, the pad subassembly 67 will pivot clockwise, as shown by arrows 95, to align itself tangentially with the workpiece outer surface. As the clamp slide 20 continues to close toward the left, as depicted by arrows 96 in FIGS. 3 and 4, the mounting assemblies 57, which are fixed to the clamp slide 20, also move leftward, but the holding mechanism will not move to any great degree with respect to the workpiece. Instead, the holding mechanism 41 will move rightward relative to the leftward moving mounting assembly 57 as shown by arrows 98 along a line generally parallel to the tangent line of the workpiece at the point of pad contact. This relative movement is against the biasing force generated by the rightmost spring 88.

When the pressure applied to the workpiece through the holding mechanisms 33,34,40 and 41 is sufficient, retraction of the jacks 48 is terminated and the workpiece is lifted from the table surface 99 by the robot 13. Once the workpiece 93 is elevated from the table, the workpiece will be retained within the handling ring 16. The holding mechanism springs 87 and 88 acting through the workpiece 93 will equalize pressure between the respective matched springs 87,88 of each spring pair to bias the workpiece to a centered position along the longitudinal axis of the yoke. The lateral center of the workpiece 93 is known from the amount of clamp slide closure.

In FIG. 8, the arrangement of three holding mechanisms 100 is shown schematically in a lift fixture of alternative construction. Herein, the holding mechanisms 100, as indicated by arcuate arrows 102, are located one-hundred-twenty degrees, plus-minus five degrees relative to each other with one lying on the yoke longitudinal axis passing through an actuator 114 of robot 113. As indicated by arrows 103, the holding mechanisms 100 have pads 104 movable tangentially relative to the workpiece 93. When the workpiece 93 is lifted, the holding mechanisms 100 provide pressure distributed equally to the workpiece 93 to center the workpiece.

Industrial Applicability

The lift fixture described herein may be applied in the manufacture of large tire carcasses for tractors and the like, but is not limited to that application. Typically, this type of tire carcass has an outside diameter of fifty to sixty-four inches or more and weighs five hundred pounds or more. Thus, it can be seen that the lift fixture can be employed with a wide range of core sizes. In this application, the springs 87 and 88 have a preload of approximately fifty pounds. The holding mechanisms can move linearly about one inch in either direction relative to their centered position with the pad subassembly plates 70 being spaced about five-eighths of an inch from the carriage subassembly plates 78 to permit a small degree of pivotability therebetween.

With a five hundred pound core, the pads will deflect about one-fourth of an inch under a one hundred pound load. The tacky carcass surface will not slide relative to the pad surface. This lack of relative movement minimizes or eliminates scuffing of the core surface by the holding pads when the core is engaged and lifted during a transporting or centering operation.

Other aspects, objects and advantages of this invention can be obtained from a study of the drawings, the disclosure and the appended claims.

I claim:

1. A lift fixture (10) for holding and centering a workpiece (93) comprising:

- a yoke (17) having arms (22,23) on either side of the longitudinal axis of the yoke and adapted to be positioned about the workpiece (93);
- a clamp (20) mounted between the yoke arms (22,23);
- means (48) for driving said clamp (20) between an open position and a closed position adjacent the workpiece (93);
- a plurality of angularly spaced holding mechanisms (33,34,40,41) adapted to grip the workpiece (93), a portion of said holding mechanisms being carried by said yoke (17) and a portion being carried by said clamp (20);
- means (57) for movably mounting each of said holding mechanisms (33,34,40,41) to one of said yoke (17) and clamp (20) to permit motion of said holding mechanisms (33,34,40,41) relative to said yoke (17) and clamp (20) along lines generally tangential to said workpiece (93);
- said mounting means (57) includes a rod (84) for each of said holding mechanisms (33,34,40,41) fixed to one of said yoke (17) and clamp (20)
- means (87,88) for biasing each of said holding mechanisms (33,34,40,41) to a preselected centered position relative to its respective mounting means (57), whereby gripping and lifting of the workpiece (93) by the holding mechanisms (33,34,40,41) permits said biasing means (87,88) to equalize the forces acting between said holding mechanisms (33,34,40,41) through the workpiece (93) thereby centering the workpiece (93) within the lift fixture (10); and
- means (81) on each of said holding mechanisms (33,34,40,41) for engaging said rod (84) and permitting linear movement of said holding mechanisms (33,34,40,41) therealong.

2. The lift fixture (10) of claim 1 wherein said holding mechanisms (33,34,40,41) comprise a pad assembly (67) and a carriage assembly (69) for supporting said pad assembly (67) relative to the lift fixture (10).

3. The lift fixture (10) of claim 2 further including means (75,76,81,82) for pivotally mounting said pad assembly (67) to said carriage assembly (69).

4. The lift fixture (10) of claim 2 wherein said holding mechanisms (33,34,40,41) are positioned on a common plane extending between said yoke arms (22,23).

5. The lift fixture (10) of claim 4 further including means (75,76,81,82) for mounting said pad assembly (67) to said carriage assembly (69) for pivotal motion about an axis generally perpendicular to said plane.

6. The lift fixture (10) of claim 1 wherein said biasing means (87,88) is a pair of springs (87,88) associated with each of said holding mechanisms (33,34,40,41), each of said springs (87,88) biasing said holding mechanisms (33,34,40,41) in opposite directions.

7. The lift fixture (10) of claim 1 wherein the number of holding mechanisms (33,34,40;41) is four, a pair being carried by each of said yoke (17) and said clamp (20) and each being mounted at an angle of approximately 45° relative to said yoke longitudinal axis and at an angle of approximately 90° relative to an adjacent holding mechanism (33,34,40,41).

8. The lift fixture (10) of claim 1 wherein the number of holding mechanisms (100) is three, each of said holding mechanisms (100) being oriented at an angle of approximately 120° relative to the adjacent holding mechanisms (100) with one of said holding mechanisms (100) mounted on one of said yoke (17) and clamp (20) generally along the yoke longitudinal axis.

9. A lift fixture (10) for holding and centering a workpiece (93) comprising:

- a yoke (17) having arms (22,23) adapted to be positioned about the workpiece (93);
- a clamp (20) mounted between the yoke arms (22,23);
- means (48) for driving said clamp (20) between an open position and a closed position adjacent the workpiece (93);
- a plurality of angularly spaced holding means (33,34,40,41), a portion thereof being carried by said yoke (17) and a portion being carried by said clamp (20);
- each of said holding means (33,34,40,41) including a rod (84) extending between end plates (60,61) fixed to the respective one of said yoke (17) and said clamp (20);
- pad assembly (67,69) slidably mounted on said rod (84) associated therewith;
- each holding means (33,34,40,41) having a pair of springs (87,88) acting on either side of said pad assembly (67,69) and preloaded to maintain said pad assembly (67,69) in a preselected centered position on said rod (84), whereby gripping and lifting of the workpiece (93) solely by said pad assembly (67,69) permits said springs (87,88) to equalize the forces between the respective springs through the workpiece (93) thereby centering the workpiece (93) within the lift fixture (10).

* * * * *